Figure 3:
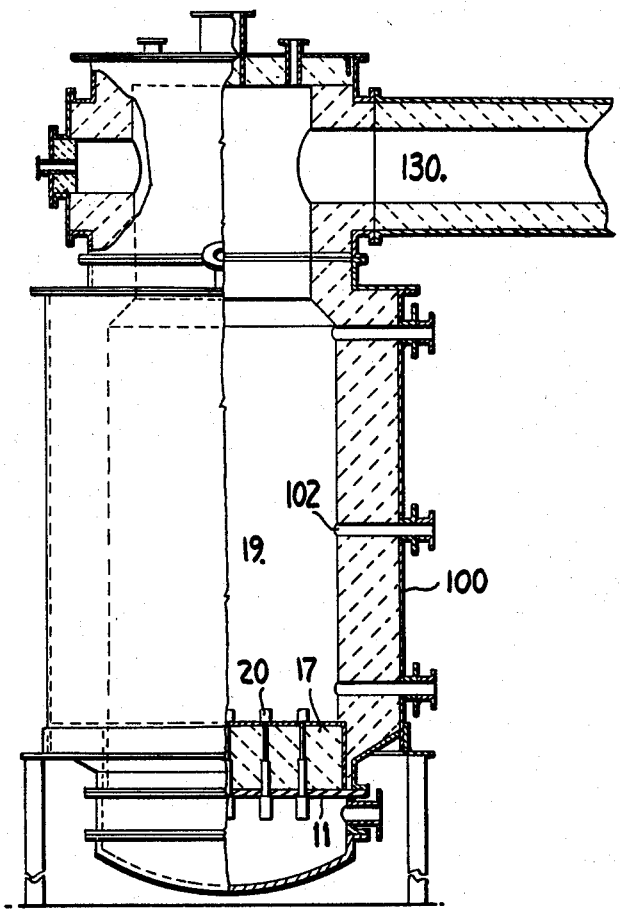

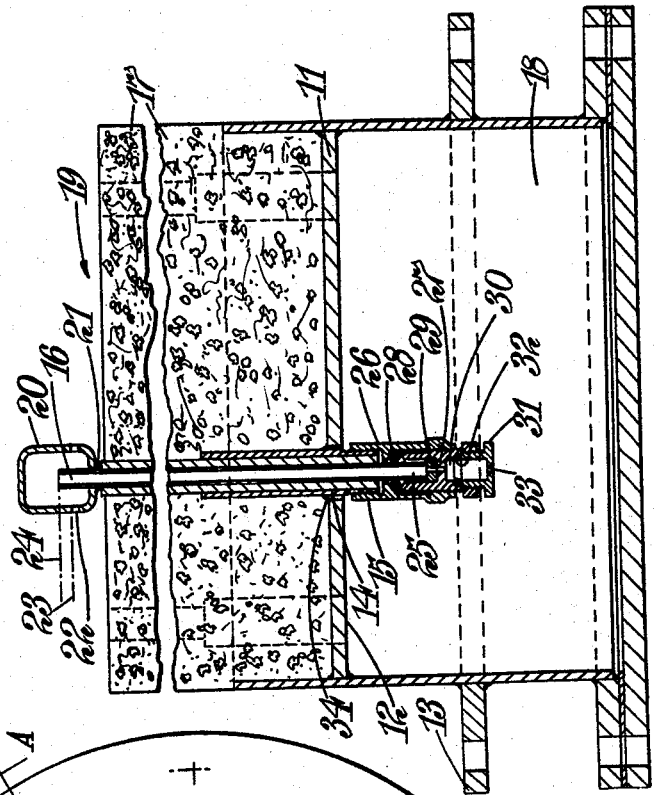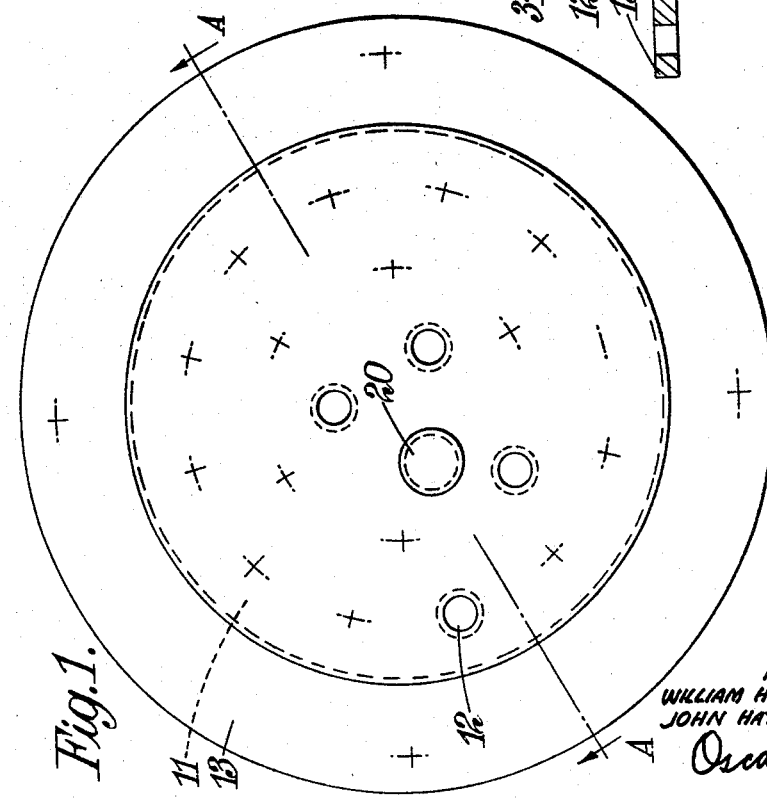
INVENTORS
WILLIAM HENRY COATES and
JOHN HAYDEN
Oscar L. Spencer
ATTORNEY

United States Patent Office 2,957,757
Patented Oct. 25, 1960

2,957,757

APPARATUS FOR THE DISTRIBUTION OF GASES

William Henry Coates, Eaglescliffe, Stockton-on-Tees, and John Hayden, Middlesbrough, England, assignors to British Titan Products Company Limited, Coppergate, England, a British company Filed Feb. 13, 1956, Ser. No. 565,251

Claims priority, application Great Britain Feb. 18, 1955

8 Claims. (Cl. 23—284)

This invention is for improvements in or relating to apparatus for the distribution of gases and has particular reference to apparatus for introducing and distributing gases through a perforated plate for the maintenance of a uniformly fluidised bed in the continuous chlorination of titanium oxide and other titaniferous materials by a fluidised bed process.

The chlorination of titanium oxide and other titaniferous materials by the fluidised bed technique in a shaft chamber is well known. Successful handling of such operations is, however, largely dependent on the means by which the gases are led into the bed. In the prior art various means have been described, the most essential feature being the admittance of gas through a uniformly perforated plate. This, however, suffers from many disadvantages which include the irregular distribution of the gases, the passage of solids through the perforated plate into the gas distributing chamber or wind box below and deterioration of the perforated plate by corrosion and erosion. Many improvements have been suggested in the prior art but for various reasons none have, so far, successfully overcome all these problems. One improvement has sought to produce through each perforation a pressure drop of the same order as the pressure drop through the bed, and in one way this has been obtained by attaching at the lower or gas entry end of each perforation a plug having an orifice or restriction to give the desired control. Such orifices require to be protected from the accumulation of fine particulate matter deposited from above and one method for overcoming this has been the insertion at the top of each perforation of a disc which is gas permeable but solids impermeable. This device, however, has the disadvantage that solids may collect on the discs leading to eventual blockage. When this happens there is a tendency for the gas to diffuse through devious irregular channels in or around the plate.

It is an object of the present invention to provide improved apparatus for introducing and distributing gases through a perforated plate for the maintenance of a uniformly fluidised bed in the continuous chlorination of titanium oxide and other titaniferous materials by a fluidised bed process.

According to the present invention there is provided apparatus for the continuous chlorination of titaniferous materials by a fluidised bed process comprising a shaft chamber to contain the fluidised bed provided at its lower end with a wind box and a perforated plate separating the fluidised bed from the wind box, the perforated plate having sealed to it through each perforation a non-porous gas distributor tube, each of the tubes having at its upper end a non-return device. The non-return device may comprise an enclosing hood having one or more apertures located below the level of the top of the distributor tube, or an inverted U-tube formed integral with the distributor tube; alternatively the distributor tube may consist of a stout walled tube at least ½ inch in thickness closed at the top and provided with one or more downwardly and outwardly inclined apertures opening into the fluidised bed.

In a preferred construction each of the distributor tubes is fitted at its lower end with a detachable plug which has a constriction or a small orifice of predetermined size so as to give rise to a predetermined pressure drop between the wind box and the distributor tube. This pressure drop is at least equal to the pressure drop across the bed.

The apparatus of the invention may be employed with particular advantage in the production of titanium tetrachloride by the chlorination of rutile in a fluidised bed process.

The perforated plate is usually made of metal and in this case the distributor tubes below their hoods are embedded in a mass of insulating material which serves to protect the metal plate from the hot fluidised bed.

The perforations in the perforated plate are conveniently spaced evenly not more than 20 inches apart and it is desirable that this spacing should be reduced towards the perimeter of the chlorinator to not more than 12 inches apart, preferably 8 inches apart.

The "non-return" device prevents solids from passing into the distributor tube and thence to the wind box.

The non-porous gas distributor tube is preferably constructed so that it is resistant to chlorine over the whole of its length. It may be metal at the lower end of the tube whereas it is usually made of non-metallic or ceramic material at the upper end to withstand the hot chlorine conditions.

The improved apparatus is particularly suitable for maintaining a substantially uniform gas flow to traverse and support a fluid bed containing particulate solids between 50 microns and 5 mm. in diameter.

A more detailed description of a fluidised bed reactor in accordance with the invention for the continuous chlorination of titanium oxide and other titaniferous materials will now be given.

In the accompanying drawings:

Figure 1 is a plan view of a perforated plate constituting the base of a fluidised bed shaft chamber. It shows a circular metal plate 11 having twenty-one perforations 12 substantially uniformly spaced over the plate. The plate is attached to the wind box housing by the flange 13, Figure 2 is a sectional elevation through A—A of Figure 1. Through each perforation of a metal plate 11 is welded a sleeve 14 terminating at its lower end with a tapered thread 15, and Fig. 3 is a diagrammatic view, partially in section, illustrating the manner in which the base illustrated in Fig. 1 is disposed in a typical shaft furnace 100.

Above the plate is loosely attached a mass of insulating material 17 which may consist of a suitably drilled slab or of brickwork built in or of cement allowed to set in situ and which serves to protect the metal plate 11 and wind box 18 below from the hot corrosive gases in the fluidised bed chamber 19 and generally to support the distributor tubes 16 to be inserted therethrough. The sleeve 14 is shown welded to the perforated plate 11. Through this is inserted the distributor tube 16 terminating at the top with a hood 20 which is connected to the tube by a joint 21 so that the hood serves as a seal for the upper end of the distributor tube except for the perforations 22, the top of which 23 is substantially below the level of the top 24 of the distributor tube. The distributor tube 16 is affixed to the metal sleeve 14 so that the lower end protrudes below the tapered end of the sleeve at 25. A gland box 26 is attached to the tapered end of the sleeve with a corresponding tapered female thread. Inside the bland box is inserted a gland nut 27 which seals the sleeve and gland box with respect to the distributor tube by means of a packing ring 28. At the lower end of the distributor tube is located a soft asbestos packing plug 29 through which is inserted the feed tube 30 of the gland nut, thus isolating the gas feed from the gland box. The feed tube 30 is, in turn, fed through the further screw plug 31 to which it is jointed by a packing rubber ring 32. In the screw plug is an accurately drilled orifice 33 which determines the fall in pressure from the wind box to the fluidised bed. It will be noted that this important member of the gas feed is so located as to be detachable and removable without necessitating the removal of the perforated plate assembly and therefore the bed. In this position is is also less prone to corrosion since it is out of contact with the solid particulate matter of the bed and the hot gases existing therein. A weld 34 prevents gases passing upwards through the exterior side of the feed device and the rubber ring 28 seals the distributor tube from the sleeve. By means of these two seals and the non porous nature of the distributor tube irregular chlorine gas entry through the insulating material 17 is avoided. The hood prevents solids entering the distributor tube but, at the same time, offers no hindrance to the gas flow through that ducting.

The chlorination of titaniferous containing materials such as, for instance, mineral rutile and ilmenite employing a fluidised bed has been fully described elsewhere and a description of the raw materials required for this purpose will be well known and understood by anyone skilled in the art. The bed normally consists of the ore suitably admixed with a reducing substance such as carbon and the gas which traverses and maintains the bed normally consists of chlorine but a mixture of chlorine containing gases may be used. The wind box and the lower parts of the distributor tube may be made in a variety of metals such as, for instance, nickel or stainless steels or mild steel. The packing material for the seals 28, 29 and 32 may be rubber, asbestos or plastic materials suitable for the handling of cold chlorine gas. The non porous distributor tube may be made of silica or other fused or adequately sintered material (i.e. ceramic materials) which will prevent gas flow through its walls. Alternatively metal may be employed. In this case the upper part of the distributor tube and the hood require to be protected by a jacket through which a cooling fluid e.g. air or water is circulated to maintain a relatively low temperature within the hot zone. A preferred cooling fluid for this purpose is titanium tetrachloride, since in the event of any small leakage in the cooler, sometimes referred to as a weeping, taking place, this would not necessarily arrest normal operation. The cement, brick work, slab or insulating material, and/or other ceramic material inserted in the intervening space bounded by the perforated plate at the bottom, the side walls of the shaft vessel 100, and the distributor tubes up to a level just below the hood may consist of a wide selection of insulating materials well known to anyone skilled in the art. The material of construction of the hood is usually similar to that of the distributor tube. Whilst the hood may be welded or fused or otherwise intimately connected to the outside wall of the distributor tube it could in certain cases, however, be affixed by, for instance, a screw or other close fit such as a ground joint through which solids cannot pass but it must be sufficiently attached that it cannot be removed by the turbulent action of the fluid bed.

Following is a description by way of example and with reference to the accompanying drawings of apparatus and a process for the production of titanium tetrachloride from mineral rutile.

The chlorinator consisted of a vertical steel shaft furnace lined with chlorine resisting material having an internal diameter of 17 inches and height 10 ft. 10 inches. Near the base was a steel plate 17 inches in diameter and having twenty-one evenly spaced perforations as in Figure 1. Through each perforation was inserted a metal sleeve 1⅜" in diameter and 5½ inches long welded on the outside periphery to the steel base plate at a point 1½ inches above the bottom of the sleeve as described above and illustrated in Figure 2.

Above this base plate was placed a slab of insulating material suitably drilled to receive the distributor tube assembly. This slab had a thickness of 10". Through each hole in the slab was inserted a silica distributor tube ⅜" internal and ⅝" external diameter to which was welded at the upper end a hood essentially cylindrical in shape 1½" internal diameter and 2⅛" high totally enclosing and sealing the exit of the tube except for two holes drilled in the cylindrical wall ³⁄₁₆" diameter and with the upper section ½" below the exit level of the distributor tube. The base of the hood protruded ¼" above the level of the insulating slab.

Attached to the lower part of the distributor tube, which protruded 1½ inches below the metal sleeve was a mild steel gland box sealed as described above with a gland nut and within the latter was screwed a mild steel plug having an orifice ¹⁄₁₆ of an inch in diameter.

The perforated plate with feed assembly supported the bed in the fluid reaction chamber, and below the plate was a wind box to distribute chlorine to the various orifices at the foot of each distributor tube. Above the fluidised bed chamber was a port 102 for screw feeding the mineral rutile and carbon in the proportion 4:1 and a further port 130 for the discharge of the gaseous products of chlorination.

The mineral rutile contained 97% $TiO_2$, 0.5% Fe and 0.5% $ZrO_2$ and had a particle size range of 70$\mu$ to 180$\mu$. The coke contained 1% mineral matter and had a particle size range of 150$\mu$ to 600$\mu$.

Initially, air was fed into the wind box through the perforated plate assembly into a mixed rutile coke bed 24 inches high. At the same time a gas flame was played onto the bed to ignite the coke. The reaction of air with the gas and carbon content of the fluidised bed enabled the pre-heating of the charge to a temperature of 900° C. At this temperature the mineral rutile and carbon charge was adjusted in the proportion 4:1, the air was shut off and 180 lbs. of chlorine per hour was admitted to the wind box. In this way chlorination was immediately initiated and the plant ran continuously for 42 days and was maintained within a temperature range of 870° to 900° C. During this period mineral rutile and coke was fed in the proportion of 4:1 amounting to 1.2 tons per day titanium oxide and periodic discharges of unattacked ore were made in order to avoid the impoverishment of the titanium oxide content due to build up of impurities such as zircon which do not chlorinate so easily in this temperature range.

The plant operated without difficulty and at the end of the run was examined with particular reference to the feed assembly. It was found that the distributor tube and the wind box were free from the dust or particulate constituents of the bed and the metal orifice in the screw plug located below the distributor tube was not only free from dust but from signs of any significant corrosion. It was also found that the ring joint was in excellent condition indicating that a gas tight joint had been maintained.

We claim:

1. Apparatus for chlorinating particulate material suspended in an upwardly rising stream of chlorine which comprises a shaft furnace having an interior portion providing a chlorination zone, a substantially non-porous plate extending across the lower portion of the chlorination zone, a chlorine chamber below said plate, a heat insulating, permeable refractory slab above the plate and providing a floor of the chlorination zone, a plurality of gas distributors comprising non-porous tubes extending through the plate and slab from the chlorination zone to the chlorine chamber, the distributors being sealed to the non-porous plate to prevent passage of chlorine between the distributors and the plate, the upper ends of the distributors terminating at a point above the slab to transmit chlorine from the chlorine chamber to a point above the slab, restricted orifices at the lower ends of the distributors, the orifices providing a substantial pressure drop between the chlorine chamber and points inside the lower ends of the distributors adjacent the non-porous plate, means for introducing chlorine into the chamber, and means for withdrawing a reaction product from the furnace.

2. The apparatus of claim 1 wherein said orifices comprise plugs sealingly and removably engaging the lower ends of said distributors, the plugs having accurately made restricted openings.

3. The apparatus of claim 1 wherein said gas distributors comprise non-porous tubes made of fused silica.

4. The apparatus of claim 1 wherein said distributors are provided with means for transmitting chlorine to a point above the slab and thence to a lower point in the chlorination zone.

5. The apparatus of claim 1 wherein said orifices are located below the non-porous plate and in the chlorine chamber.

6. The apparatus of claim 1 wherein the non-porous plate forms the top of the chlorine chamber.

7. The apparatus of claim 1 wherein the gas distributors are made of ceramic material.

8. The apparatus of claim 1 wherein the gas distributors are made of metal.

References Cited in the file of this patent

UNITED STATES PATENTS

| | | |
|---|---|---|
| 2,345,423 | Pfannmuller | Mar. 28, 1944 |
| 2,378,675 | Agnew | June 19, 1945 |
| 2,503,788 | White | Apr. 11, 1950 |
| 2,657,976 | Rowe | Nov. 3, 1953 |
| 2,721,118 | Accaries | Oct. 18, 1955 |
| 2,813,016 | Thornhill | Nov. 12, 1957 |
| 2,841,476 | Dalton | July 1, 1958 |

FOREIGN PATENTS

| | | |
|---|---|---|
| 69,884 | Denmark | Sept. 5, 1949 |
| 521,712 | Belgium | Aug. 14, 1953 |
| 521,987 | Belgium | Aug. 7, 1953 |